United States Patent
Sun

(10) Patent No.: US 10,014,689 B2
(45) Date of Patent: Jul. 3, 2018

(54) METHODS TO FORM AND OPERATE MULTI-TERMINAL POWER SYSTEMS

(71) Applicant: RENSSELAER POLYTECHNIC INSTITUTE, Troy, NY (US)

(72) Inventor: Jian Sun, Clifton Park, NY (US)

(73) Assignee: RENSSELAER POLYTECHNIC INSTITUTE, Troy, NY (US)

(*) Notice: Subject to any disclaimer, the term of this patent is extended or adjusted under 35 U.S.C. 154(b) by 101 days.

(21) Appl. No.: 15/035,788

(22) PCT Filed: Oct. 31, 2014

(86) PCT No.: PCT/US2014/063288
§ 371 (c)(1),
(2) Date: May 11, 2016

(87) PCT Pub. No.: WO2015/073224
PCT Pub. Date: May 21, 2015

(65) Prior Publication Data
US 2016/0285270 A1    Sep. 29, 2016

Related U.S. Application Data

(60) Provisional application No. 61/905,424, filed on Nov. 18, 2013, provisional application No. 61/905,428, filed on Nov. 18, 2013.

(51) Int. Cl.
*H02J 1/00*    (2006.01)
*H02J 3/38*    (2006.01)
(Continued)

(52) U.S. Cl.
CPC ........... *H02J 3/383* (2013.01); *H02J 3/00* (2013.01); *H02J 3/38* (2013.01); *H02J 3/386* (2013.01); *H02M 7/04* (2013.01); *H02M 7/44* (2013.01)

(58) Field of Classification Search
CPC ...... H02J 3/00; H02J 3/383; H02J 3/38; H02J 3/386; H02M 7/04; H02M 7/44
See application file for complete search history.

(56) References Cited

U.S. PATENT DOCUMENTS 4,419,591 A    12/1983    Irokawa et al.
5,744,936 A    4/1998    Kawakami
(Continued)

FOREIGN PATENT DOCUMENTS

CN    102301578 A    12/2011
JP    2009291054 A    12/2009
(Continued)

OTHER PUBLICATIONS

Machine translation of JP 2009291054; Fuji Electric Systems Co Ltd; Dec. 10, 2009.*
(Continued)

*Primary Examiner* — Jared Fureman
*Assistant Examiner* — Duc M Pham
(74) *Attorney, Agent, or Firm* — Heslin Rothenberg Farley & Mesiti P.C.

(57) ABSTRACT

A method for forming and operating a multi-terminal power system, includes: connecting multiple sending terminals to a network of a power system; and local control of each sending terminal to behave as a constant-power source such that both output voltage and output current of the sending terminal may simultaneously vary in response to changing external circuit conditions while maintaining constant a product of the output voltage and the output current of the sending terminal. At least one sending terminal may include a capacitive output converter having a capacitor connected between two output terminals and a controlled current source connected in parallel to the capacitor, or an inductive output converter having an inductor connected to an output
(Continued)

terminal and a controlled voltage source connected in series with the inductor.

17 Claims, 8 Drawing Sheets

(51) Int. Cl.
*H02J 3/00* (2006.01)
*H02M 7/04* (2006.01)
*H02M 7/44* (2006.01)

(56) References Cited

U.S. PATENT DOCUMENTS

| | | | |
|---|---|---|---|
| 6,118,678 | A | 9/2000 | Limpaecher et al. |
| 6,515,544 | B1 | 2/2003 | Suzuki et al. |
| 6,670,721 | B2 | 12/2003 | Lof et al. |
| 8,080,898 | B2 | 12/2011 | Fukuhara |
| 8,288,892 | B2 | 10/2012 | Gaul |
| 2012/0173035 | A1 | 7/2012 | Abe |
| 2012/0175962 | A1 | 7/2012 | Zhan et al. |
| 2012/0319489 | A1* | 12/2012 | McCaslin ............ H02J 1/10 307/77 |
| 2013/0197704 | A1* | 8/2013 | Pan .................... H02J 3/36 700/287 |
| 2013/0200710 | A1* | 8/2013 | Robbins ......... H01L 31/02021 307/77 |

FOREIGN PATENT DOCUMENTS

| | | |
|---|---|---|
| WO | 03058789 A1 | 7/2003 |
| WO | 2010/081746 A2 | 7/2010 |

OTHER PUBLICATIONS

International Search Report for PCT/US2014/063288 dated May 18, 2015.

Temesgen Mulugeta Haileselassie, "Control of Multi-Terminal VSC-HVDC Systems," Norwegian University of Science and Technology, Department of Electrical Power Engineering, Jun. 2008.

Mohamadreza Baradar, "Modeling of Multi Terminal HVDC Systems in Power Flow and Optimal Power Flow Formulations," KTH School of Electrical Engineering, 2013, Stockholm, Sweden.

Haileselassie, et al; "Multi-Terminal VSC-HVDC System for Integration of Offshore Wind Farms and Green Electrification of Platforms in the North Sea," NORPIE/2008, Nordic Workshop on Power and Industrial Electronics, Jun. 9-11, 2008, pp. 1-8.

Michael Hausler, "Multiterminal HVDC for High Power Transmission in Europe," CEPEX99, Mar. 1999, Poland.

Temesgen Mulugeta Haileselassie, "Multiterminal HVDC for Offshore Windfarms—Control Strategy," 2009.

Hassan, et al; "Review of Control Methods for HVDC Transmission Systems," 2013.

Communication Pursuant to Article 94(3) EPC, issued by the European Patent Office, dated Jul. 19, 2017.

\* cited by examiner

METHODS TO FORM AND OPERATE MULTI-TERMINAL POWER SYSTEMS

CROSS-REFERENCE TO RELATED APPLICATIONS

This application is a national stage filing under section 371 of International Application No. PCT/US2014/063288, filed on Oct. 31, 2014, and published in English on May 21, 2015 as WO 2015/073224 A2, and claims priority to U.S. Provisional Application Nos. 61/905,424 and 61/905,428 filed on Nov. 18, 2013, the entire disclosures of each of the prior applications are hereby incorporated by reference herein.

GOVERNMENT LICENSE RIGHTS

This invention was made with government support under contract number 400117371 awarded by the Department of Energy. The government has certain rights in this invention.

BACKGROUND ART

Electric power is usually supplied in the form of a voltage source, where the supply voltage is maintained constant while the supply current varies with the loading condition. Two or more voltage sources ($v_1, v_2 \ldots v_n$) can be connected in series, as illustrated in FIG. 1a, to provide a higher supply voltage. Parallel connection of voltage sources, on the other hand, is difficult because a slight mismatch of the voltages can result in large current unbalance among the parallel sources.

Sometimes, current-source behavior is required or preferred by certain loads for which the supply current has to be maintained constant while the supply voltage can fluctuate according to the loading condition. Two or more current sources ($i_1, i_2 \ldots i_n$) can be connected in parallel, as illustrated in FIG. 1b, to provide a higher supply current. However, series connection of current sources is difficult because of the need to precisely match the currents.

Renewable energy (such as wind and solar) and other distributed generation (DG) sources are usually integrated into the power grid through a power electronics interface that provides power conditioning and control of the raw source output. The common practice is to control the interface to behave like a current source that injects a certain amount of current into the power grid depending on the amount of power the source is able or required to produce. Current-source behavior is desirable in this case because it avoids conflicts with the grid which is a voltage source.

In practice, the grid is not an ideal voltage source due to the series impedances of the lines, transformers, and generators. Likewise, the interface cannot be made a perfect current source which, by definition, has infinite output impedance. In the presence of such non-ideal effects, the stability of the DG-grid system requires that the ratio of the grid impedance to the interface output impedance satisfy the Nyquist criterion. See J. Sun, "Impedance-based stability criterion for grid-connected inverters," *IEEE Transactions on Power Electronics*, vol. 27, no. 11, pp. 3075-3078, November 2011.

Multiple solar or wind sources can be connected to the power grid through their own grid interfaces, effectively operating in parallel with each other as current sources. There is an increasing need to operate such sources in series as a way to reduce the cost and increase the efficiency of the power conditioning interface. There are several examples for such applications:

1) Multi-Terminal DC Transmission for Offshore Wind: DC transmission is favored over ac transmission for offshore wind because of the difficulties associated with transferring power over long undersea ac cables. For this application, as illustrated in FIG. 2a, the series-DC architecture (10), in which each wind turbine (12) is controlled to produce a DC output and multiple such DC terminals (14) are connected in series to build a sufficiently high DC voltage for transmission to the onshore power grid, is advantageous as it eliminates redundant DC-AC (16) and AC-DC (18) conversion stages required when an AC offshore collection bus (24) is used, as illustrated in FIG. 2b.

2) Direct Connection of Solar Inverters to Medium-Voltage Distribution Lines: Commercial (large-scale) solar installations are usually integrated to the power grid by connecting to a medium-voltage (e.g. 15 kV or 33 kV) distribution line. To avoid the need for high-voltage electronics, as illustrated in FIG. 3a, the output of each solar inverter (26) is kept at a low voltage level (e.g. 480 V), and a medium-voltage transformer (28) is used to step up the voltage for connecting to the distribution grid or network (30). An alternative architecture, depicted in FIG. 3b, is to connect multiple solar inverters (26) in series such that they can interface directly with a medium-voltage distribution network (30) without a bulky step-up transformer.

3) Modular Low-Voltage Microinverters: As illustrated in FIG. 4a, a microinverter (32) generates 50/60 Hz AC from the DC output of a single solar panel (34). Since the panel output voltage is usually a fraction of the peak voltage of the power grid (36), e.g. 160 V in residential buildings, a microinverter requires a transformer to step up the voltage, as well as the use of high-voltage devices that can withstand the peak grid voltage. The use of a transformer and high-voltage devices can be avoided by designing each microinverter to generate a voltage lower than the panel output voltage and by operating multiple microinverters (32) in series for connecting to the unity grid (36), as depicted in FIG. 4b. This scheme is similar to that shown in FIG. 3b, and reduces the cost and increases the efficiency of the microinverters.

Common to these three examples are that a) multiple power sources (referred to as sending terminals hereinafter) are connected in series to form a string, and b) the string is connected in parallel with a DC or AC power grid which can be considered a voltage source. To facilitate the series connection, individual sending terminals should act as voltage sources, while the string should behave like a current source in order to operate in parallel with the grid, which is a voltage source.

Such mixed voltage and current source behavior between individual sending terminals and the overall string could be achieved by a central controller when all sending terminals are located in close proximity, e.g. in the same housing. In that case, as depicted in FIG. 5, the central controller (40) would control the total string voltage by regulating the output voltage of individual sending terminals (42, 42'), and an inductor (L, L') could be inserted in series to absorb the instantaneous voltage difference between the string and the grid, effectively turning the string into a controlled current source.

This central control scheme can work in both DC and AC networks, but requires a high-speed communication link between the controller and each sending terminal, which is difficult to implement when the sending terminals are dispersed, such as in the three examples discussed above, where the physical dimension of a string may range from several meters for rooftop microinverters to several kilometers for offshore wind turbines. The speed of the central control must be comparable with the switching frequency of the semiconductor devices used in each wind turbine or solar converter, such that a loss of control signal for even a few milliseconds may result in destructive damage and bring down the entire string. The central control is also difficult to modularize and to maintain. Therefore, a different approach is needed in order to enable such series connection of renewable sources into the power grid.

BRIEF SUMMARY OF THE INVENTION

The present invention provides a method for forming and operating a multi-terminal power system, comprising: connecting multiple sending terminals to a network of a power system; and local control of each sending terminal to behave as a constant-power source such that both output voltage and output current of the sending terminal may simultaneously vary in response to changing external circuit conditions while maintaining constant a product of the output voltage and the output current of the sending terminal.

The changing external circuit conditions may include: varying voltage and current of the network the multi-terminal power system is connected to, or varying power levels of the sending terminals; and the multiple sending terminals may be connected in a series, parallel or a matrix configuration.

According to an aspect of the present invention, at least some of the multiple sending terminals may be connected in series to form a string, and the string may be connected in parallel with a bus of the network, the bus behaving as a voltage source.

The string may advantageously comprise a series connection of: solar inverters or microinverters directly interfacing with a distribution network or grid, or offshore wind turbines with DC output for DC transmission to an onshore power grid.

According to another aspect of the present invention, at least some of the multiple sending terminals may be connected in parallel to form a row, and the row may be connected in series with a bus of the network, the bus behaving as a current source.

Each sending terminal may advantageously comprise a renewable energy source and an associated power conditioning circuit, with the local control producing constant power source behavior at output terminals of the power conditioning circuit.

The method may further include: modifying constant-power source behavior of the sending terminal by reducing power output of the sending terminal when at least one of the output voltage or the output current exceeds a pre-specified level.

If the sending terminal comprises an AC source, power of the constant-power source means average power over a fundamental cycle.

In one aspect of the present invention, at least one sending terminal may include a power conditioning circuit comprising a capacitive output converter having a capacitor connected between two output terminals and the rest of the power conditioning circuit acts as a controlled current source connected in parallel to the capacitor, and the local control may comprise: controlling the current source to follow P/v as a reference, where P is the desired output power of the converter and v is the voltage across the output capacitor.

In another aspect of the present invention, at least one sending terminal may include a power conditioning circuit comprising an inductive output converter having an inductor connected to an output terminal and the rest of the power conditioning circuit acts as a controlled voltage source connected in series with the inductor, and the local control may comprise: controlling the voltage source to follow P/i, where P is the desired output power of the converter and i is a current through the inductor.

To provide fault isolation, a by-pass diode may be connected in parallel to the output terminals of the power conditioning circuit, and a disconnect switch may be connected in series between the output terminals and the bypass diode.

In one embodiment of the present invention, the renewable source powering a sending terminal may comprise a wind turbine driving a generator, and the associated power conditioning circuit converts the generator AC output into DC. The local control involves a generator-side control and a network-side control, with the generator-side control regulating the renewable energy source such that maximal amount of power is extracted, and the network-side control being responsible for providing the constant-power source behavior.

The generator-side control may provide a power signal to the network-side control indicating amount of power that is available for feeding into the network, and the network-side control may use this signal as a command to control output power, and the network-side control may communicate a level of desired power level to the generator-side control during start-up, shut-down, or power curtailment when the output power has to be reduced or limited.

The power conditioning circuit in this embodiment may further comprise a rectification circuit that includes a rectifier that converts the generator output into DC, and a DC-DC converter that steps up the output of the rectifier into a higher voltage and also provides galvanic isolation using a high-frequency transformer. The DC-DC converter can be a capacitive output converter or an inductive output converter. The generator-side control controls the rectifier and the network-side control controls the DC-DC converter.

BRIEF DESCRIPTION OF THE DRAWING FIGURES

Features, benefits and aspects of the present invention will be readily understood from the following detailed description of various embodiments, taken in conjunction with the accompanying drawings, in which.

Figure 6:
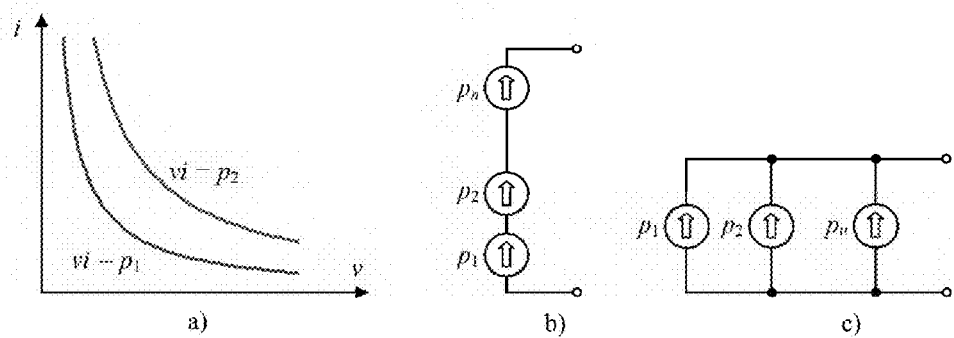
Figure 7:
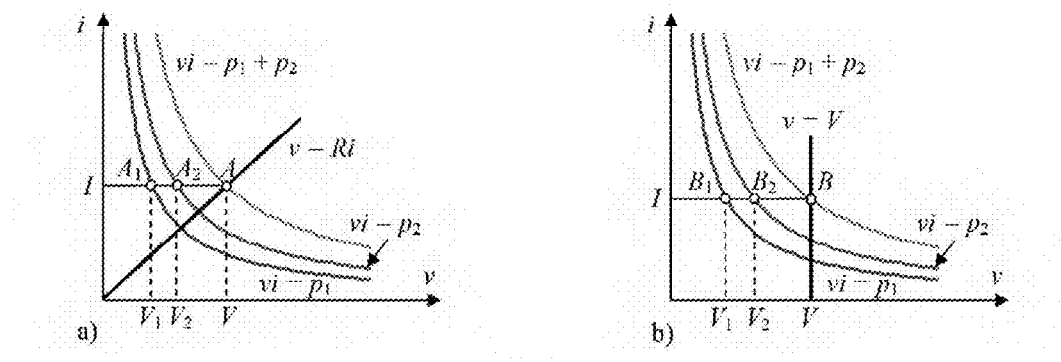
Figure 8:
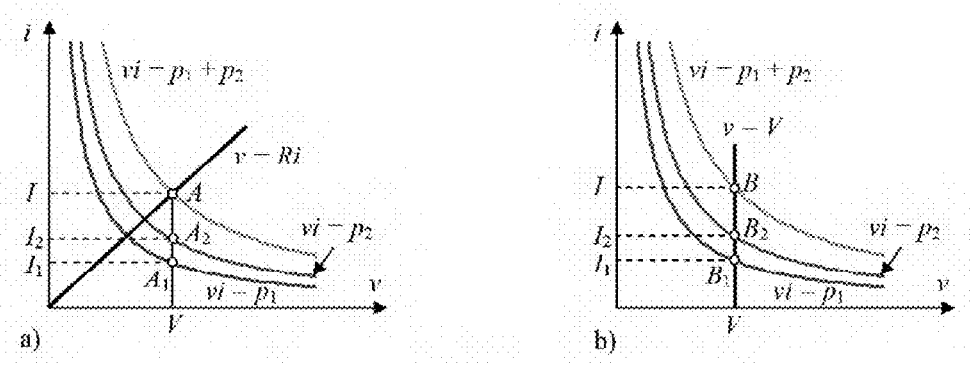
Figure 9:
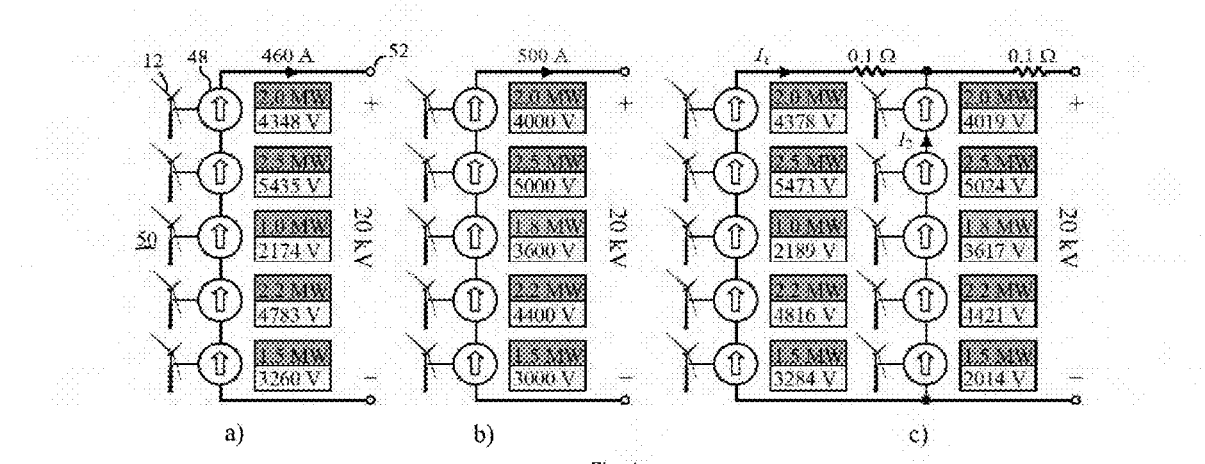
Figure 10:
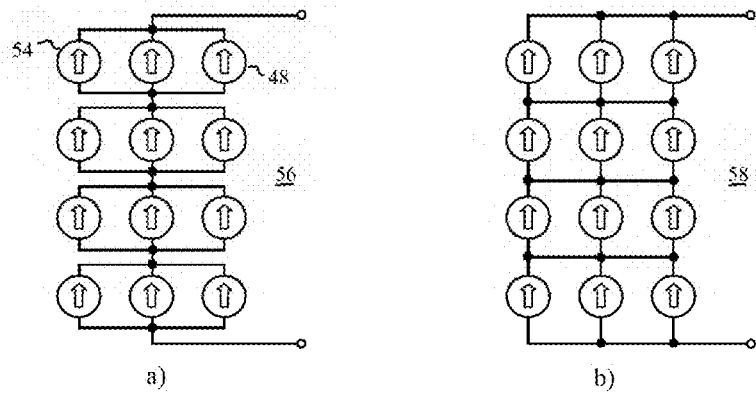
Figure 11:
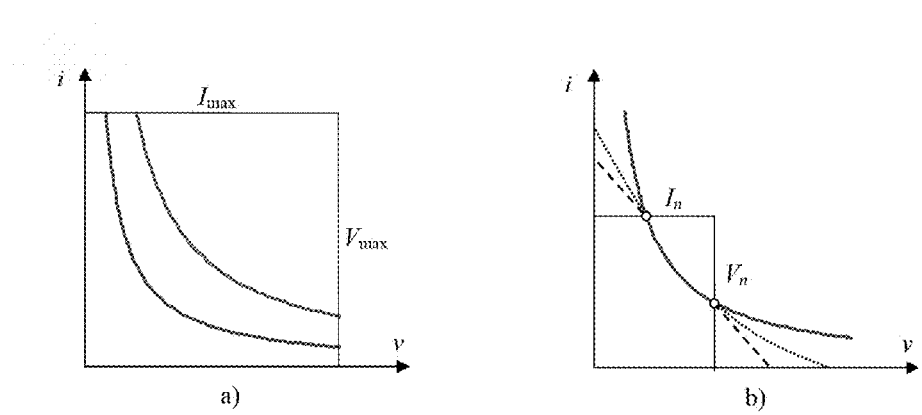
Figure 12:
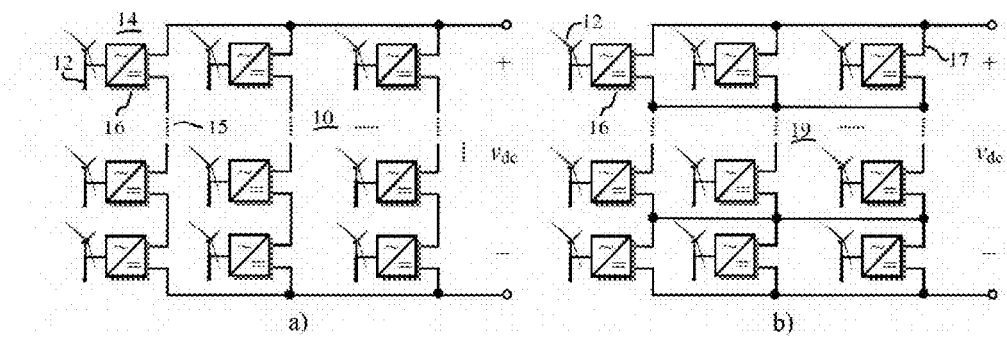
Figure 13:
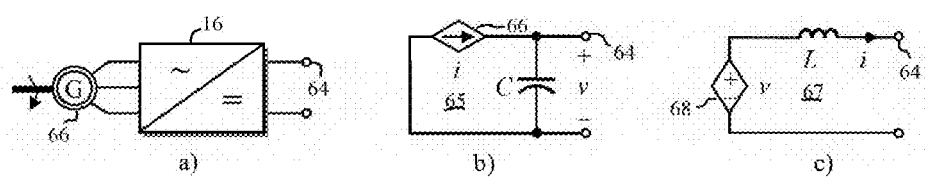
Figure 14:
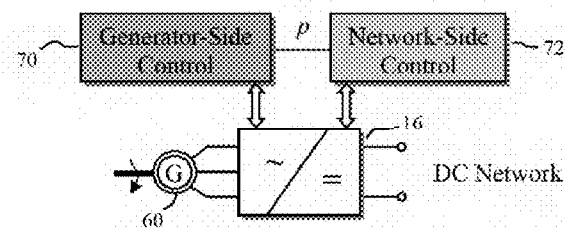
Figure 15:
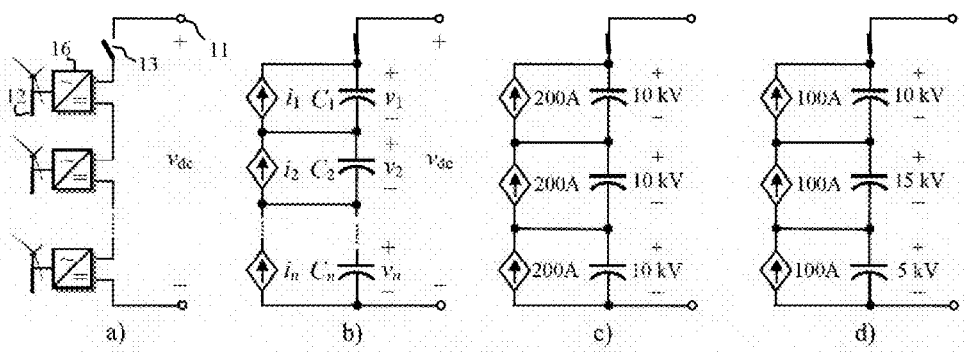
Figure 16:
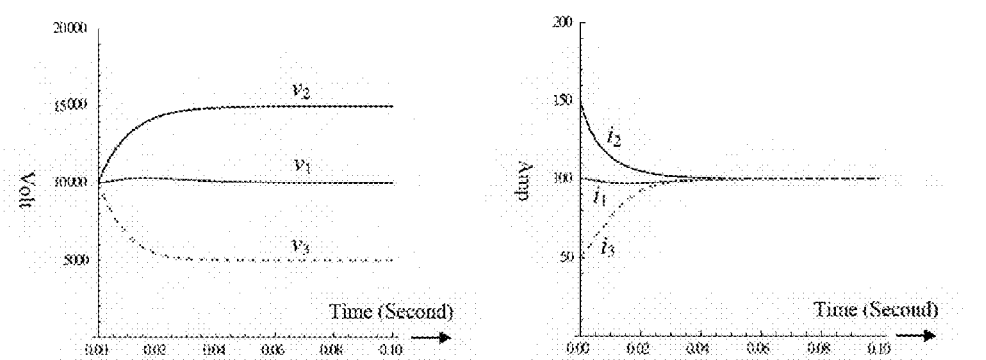
Figure 17:
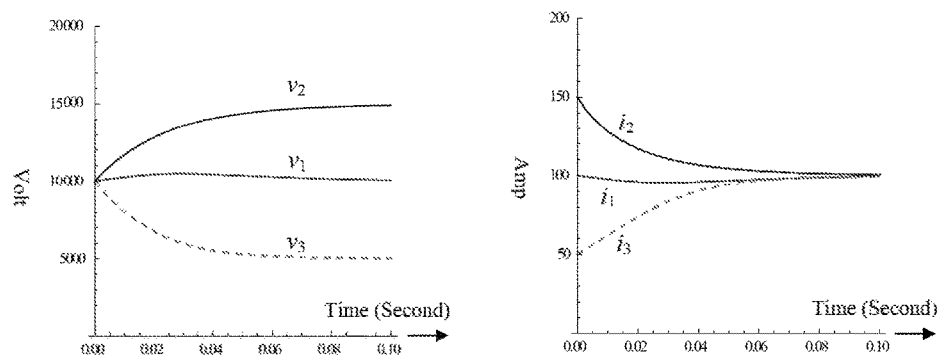
Figure 18:
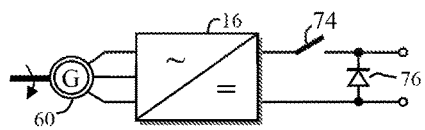
Figure 19:
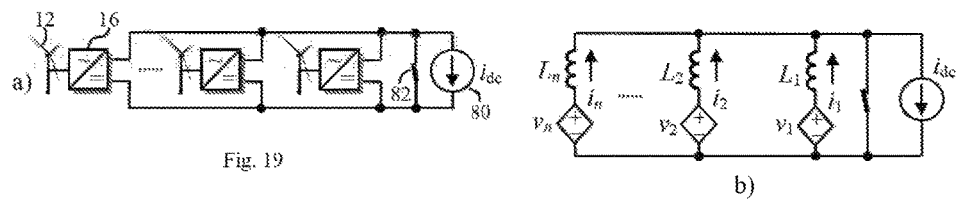
Figure 20:
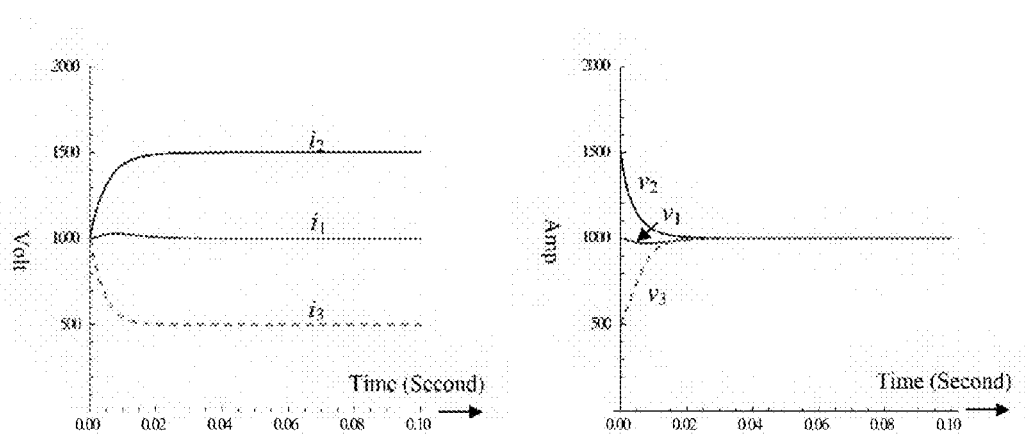

FIG. 6 presents (a) i-v characteristics of constant-power sources (CPS), (b) series connection of CPS, and (c) parallel connection of CPS;

FIG. 7 illustrates operation of two CPS in series (a) in standalone mode with a resistive load, and (b) connected to a voltage source;

FIG. 8 illustrates operation of two CPS in parallel (a) in standalone mode with a resistive load, and (b) connected to a voltage source;

FIG. 9 depicts operation of series-connected wind turbines controlled as CPS;

FIG. 10 depicts (a) a series-row architecture, and (b) its equivalent matrix configuration;

FIG. 11 depicts modification of CPS characteristics to reduce terminal voltage and current variation by (a) voltage and current limiting, and (b) power curtailment;

FIG. 12 illustrates multi-terminal DC transmission architectures for grid integration of offshore wind employing (a) parallel strings, and (b) series rows (matrix), with bus voltage assumed to be imposed by the onshore power station;

FIG. 13 depicts (a) an electric system of a turbine, (b) a converter with a capacitive output, and (c) a converter with an inductive output;

FIG. 14 depicts overall local control of a turbine including both generator side and network side controls;

FIG. 15 depicts (a) a string of n wind turbines, (b) equivalent circuit of the string with each turbine represented by its capacitive-output converter, (c) and (d) string voltages under two different conditions;

FIG. 16 depicts transient responses of a three-terminal string to power step changes;

FIG. 17 depicts transient responses of a three-terminal string to power step changes with difference capacitance;

FIG. 18 illustrates inclusion of a disconnect switch and a bypass diode to provide fault isolation capabilities;

FIG. 19 depicts (a) a row of inductive-output terminals in series with a current-source bus, and (b) its equivalent circuit; and FIG. 20 depicts transient responses of a three-terminal row to power step changes.

DETAILED DESCRIPTION

The solution presented by the current invention to resolve the conflicting requirements for voltage-source behavior for individual sending terminals in a string and current-source behavior of the overall string, is to make each sending terminal behave as a constant-power source (CPS). Unlike a voltage or current source, in which only the supply current or voltage varies with external conditions, both the output voltage and output current of a CPS vary with external conditions while the product of the output voltage and the output current remains constant. Mathematically, this can be described by $p = v \cdot i = \text{constant}$, where $v$ and $i$ are the output voltage and output current, respectively. This notation is appropriate for DC sources.

For AC sources, the power should be understood as the average power over a fundamental cycle. Additionally, it should be noted that the output power of a constant-power source may vary over time due to change in either the amount of power that is available or is required. FIG. 6a illustrates the i-v characteristics of such constant-power sources.

Constant-power sources can operate in either parallel or series with each other, as illustrated in FIGS. 6b and 6c, respectively, where a new symbol is introduced to represent a CPS (48). In either configuration, both the output voltage and current of each CPS depends on the external circuit. To illustrate how a CPS adjusts its output voltage and output current to external circuit conditions, consider a series connection of two DC CPS, whose output power is $p_1$ and $p_2$, respectively. FIG. 7 shows the i-v characteristics of each CPS as well as their combination.

Consider Two Cases:
1) Standalone Operation with Resistive Load (FIG. 7a):
The i-v characteristic of the load is represented by a straight line ($v = Ri$) starting from the origin. The intersection point, A, of this line with the combined constant-power curve ($vi = p_1 + p_2$) defines the combined output voltage (V) of the two CPS and the current (I) through the load. The horizontal line passing point A intersects with each CPS i-v curve, and the intersection point ($A_1$ and $A_2$) represents the operation point of the corresponding CPS.
2) Parallel Operation with a Voltage Source (FIG. 7b):
The i-v characteristic of the parallel voltage source is represented by a vertical line $v = V$. This line intersects with the combined constant-power curve ($vi = p_1 + p_2$), and the intersection point, B, defines the current (I) supplied by each CPS. The horizontal line passing point B intersects with each CPS i-v curve, and the intersection point ($B_1$ and $B_2$) represents the operation point of the corresponding CPS.

Although the above analysis was for specific CPS and load conditions, it will be apparent that the series connected CPS can adjust to varying load conditions as well as power level of each CPS. The same analysis can be performed for parallel CPS. As an example, consider two CPS in parallel with two different types of loads:
1) Standalone Operation with Resistive Load (FIG. 8a):
The i-v characteristic of the load is again represented by a straight line ($v = Ri$) starting from the origin. The intersection point, A, of this line with the combined constant-power curve ($vi = p_1 + p_2$) defines the output voltage (V) of both CPS and their combined output current (I). The vertical line passing point A intersects with each CPS i-v curve, and the intersection point ($A_1$ and $A_2$) defines the output current ($I_1$ and $I_2$) of the corresponding CPS.
2) Parallel Operation with a Voltage Source (FIG. 8b):
The i-v characteristic of the parallel voltage source is again represented by a vertical line $v = V$. This line intersects with the combined constant-power curve ($vi = p_1 + p_2$), and the intersection point, B, defines the output voltage (V) of both CPS. The same vertical line intersects with each CPS i-v curve, and the intersection point ($B_1$ and B2) defines the output current ($I_1$ and $I_2$) of the corresponding CPS.

The above analysis can be extended to any number of CPS connected to series or parallel, or the combination of both.

Figure 1:
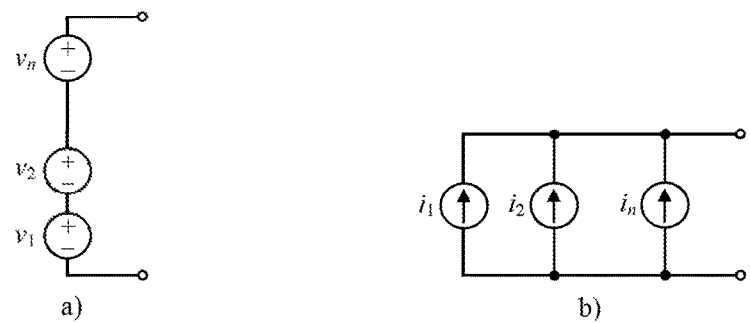
FIG. 1 depicts (a) multiple voltage sources in series, and (b) multiple current sources in parallel.
Figure 2:
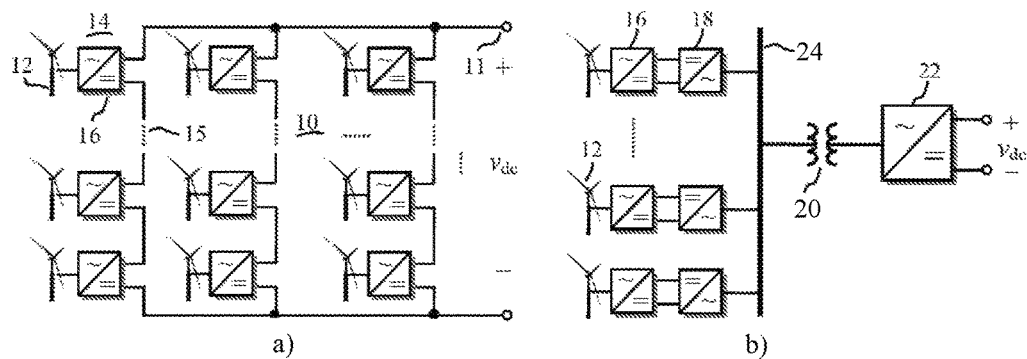
FIG. 2 depicts offshore wind farm architectures for (a) DC transmission to an onshore power grid employing a multi-terminal series-DC arrangement, and (b) an AC collection bus with a step-up transformer and a central rectifier station.
Figure 3:
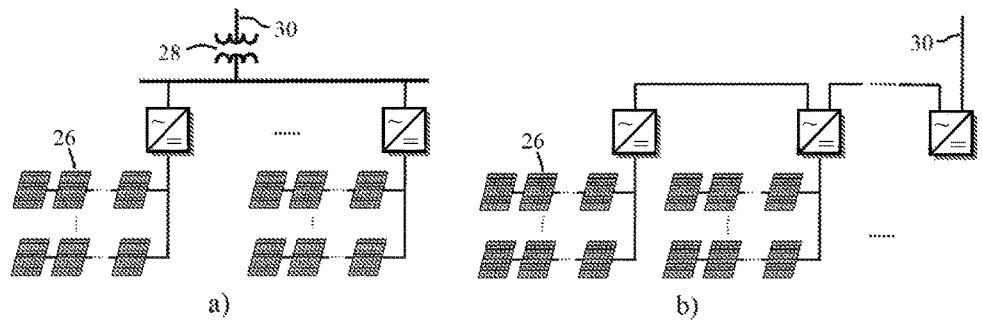
FIG. 3 depicts a commercial solar system connected to medium-voltage distribution lines using (a) medium-voltage transformers, and (b) a series connection of inverters for direct (transformer-less) grid interface.
Figure 4:
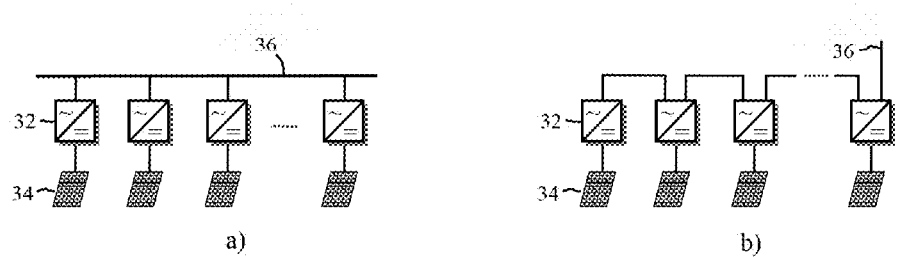
FIG. 4 depicts connection of microinverters (a) in parallel and (b) in series, for interfacing with a low-voltage utility grid.
Figure 5:
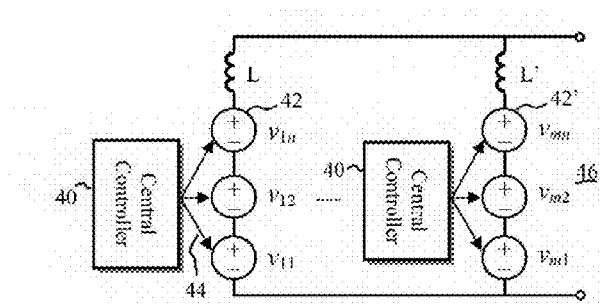
FIG. 5 illustrates central control of a string voltage and creation of current-source behavior by using a series inductor.

Consider now specifically the application of the present invention in multi-terminal DC transmission of offshore wind, as depicted in FIG. 2a. Assume that each turbine generator output is conditioned by a regulated rectifier to behave like a CPS at the DC output terminals. When all mechanical and electrical power losses are ignored, the DC output power is equal to the power the turbine blades extract from the wind.

The fact that the power extracted by the wind turbine is fixed under a given wind condition should not be confused with the constant-power source behavior of the power conditioning circuit measured at its output terminals: A fixed amount of power can also be transferred by a voltage or a current source. The CPS behavior as defined here refers to the fact that both its terminal voltage and current can simultaneously vary with the load. It is this unique capability to adjust both output voltage and current simultaneously in accordance with external circuit conditions while maintaining constant a product of the output voltage and the output current of the sending terminal that distinguishes a constant-power source from a voltage or current source.

Without losing generality, consider five wind turbines (12) forming a string (50) and connected to a 20 kV DC bus (52), as depicted in FIG. 9a. Assume that the output power of the turbines (from top down) is 2 MW, 2.5 MW, 1 MW, 2.2 MW, and 1.5 MW, respectively, and each turbine output is conditioned to behave like a CPS (48). Ignore all power losses such that each CPS output power is equal to the corresponding turbine output. The string current in this case can be calculated to be:

$$I = \frac{\sum_{i=1}^{5} P_k}{20,000} = \frac{9,200,000}{20,000} = 460 \text{ A}. \quad (1)$$

The voltage of each terminal is shown in FIG. 9a below the output power of each turbine.

Assume now that the condition of the third turbine from the top has changed, increasing its output power to 1.8 MW. As soon as this happens, the following will occur:
1) The output voltage of the third CPS increases such that its output power will increase towards 1.8 MW;
2) The output voltage of other CPS decreases in order to keep the total string voltage at 20 kV, which is imposed by the DC bus;
3) The string current increases to compensate for the decreasing voltage of other CPS.

The net results are illustrated in FIG. 9b, where the string current has increased to 500 A and each CPS output voltage has adjusted itself to a new level that meets both the CPS as well as the overall string voltage constraints. It should be noted that, with ideal CPS and DC bus voltage (no impedance), these adjustments will occur simultaneously and instantly. It should also be apparent that multiple strings can be connected to the DC bus at the same time and they will operate independently from each other so long as the DC bus (with the connection cables) can be considered an ideal voltage source (without any impedance). In the presence of bus and cable impedance, the operation of parallel strings will be slightly coupled.

As an example, FIG. 9c shows two strings connected in parallel. The cable connecting each string is assumed to have R=0.1Ω resistance. For the purpose of comparison, same turbine output power levels as used in FIG. 9a) and b) are assumed. The two string currents are denoted by $I_1$ and $I_2$ (see FIG. 9c), and can be solved from the following equations:

$$\frac{9,200,000}{I_1} + RI_1 + R(I_1 + I_2) = 20,000$$

$$\frac{10,000,000}{I_2} + R(I_1 + I_2) = 20,000$$

These equations have two sets of complex solutions and two sets of real solutions. It is easy to verify that the actual solutions are $I_1$=463.3 A and $I_2$=502.4 A, which are slightly higher than those when there is no resistance. The corresponding turbine voltages are given in FIG. 9c.

In addition to the parallel-string structure shown in FIG. 9c, one can also connect wind turbine terminals (48), and CPS sending terminals in general, in parallel to form a row (54) first, and then connect multiple rows in series, as depicted in FIG. 10a. When the interconnect cable impedance is ignored, such series-row structure (56) is equivalent to the meshed (matrix) structure (58) shown in FIG. 10b.

As illustrated by the examples in FIG. 9, power variation in one sending terminal can cause large variation to all sending terminal output voltages in the parallel-string architecture. The string current, on the other hand, is less sensitive to individual sending terminal power variations, as it is driven by the total power and voltage of the string. In contrast, the row voltage in the series-row architecture is less sensitive to individual sending terminal power output in a row, but each sending terminal current within a row can change significantly when other sending terminal power changes.

In addition to selecting a proper architecture, the variation in sending terminal voltage and current can also be reduced by modifying the CPS characteristic such that the power output reduces when the sending terminal voltage and current exceeds certain level. This can be implemented in different ways, including:
1) Voltage and Current Limiting (FIG. 11a): Both voltage and current are limited by a maximal value ($V_{max}$ and $I_{max}$) and the sending terminal effectively operates as a constant-voltage ($V_{max}$) or constant-current ($I_{max}$) source beyond these limits.
2) Power Curtailment (FIG. 11b): The sending terminal output power is gradually reduced as the sending terminal output voltage or current exceeds a pre-specified level ($V_s$ or $I_s$). This can be implemented in different ways, some of which are illustrated by the dashed lines in FIG. 11b.

These features can be programmed into the control of individual CPS sending terminal, and should be coordinated with the control of the prime source (wind turbine) to maintain power balance between input and output power. Dependency of the i-v characteristic of one sending terminal on other sending terminals may also be introduced to further improve the performance. Such mutually dependent sending terminal characteristics can be implemented autonomously within each sending terminal based on estimated operation conditions of other sending terminals, or through communication among sending terminals. The bandwidth required to implement such communication is low as it only needs to carry slow-varying power signals, and the system can be made to tolerate communication failure.

The analysis presented so far assumed ideal CPS and DC bus behavior. Under these conditions (and when only the resistance of the cable is considered), system response to any change will be instantaneous, that is, the system will adjust itself and settle on a new operation point instantly. In practice, cables have capacitance and inductance in addition to resistance. The DC bus in offshore wind farm is usually established by the onshore inverter station and has its own dynamics. Each CPS also has dynamics depending on its physical (turbine, generator, and power electronics) as well as control design.

Because of these dynamics, the transition of system operation from one point to another cannot be instantaneous; instead, each change in CPS power and other parameters will induce a transient affecting all voltages and currents of the system. The behavior of the system during such transients as well as the ability of the system to settle on a new operating point (stability) can be analyzed by dynamic models of the system. Such dynamic models can also be used to design CPS control to ensure stability and satisfactory responses during transients. Design and dynamic control of CPS to achieve these objectives will be described hereinafter.

Methods to form multi-terminal power systems using constant-power sources (CPS) have been described above. A CPS allows both its output voltage and current to vary with external circuit conditions, hence can be connected in either series or parallel with other CPS. Meshed (matrix) configurations are also possible. In contrast, conventional voltage or current sources can only be connected in series or in parallel, respectively. More importantly, a string (series-connected) or row (parallel-connected) of CPS can operate in parallel or series with another voltage or current source.

The ability to operate in parallel with a voltage source is particularly useful in the integration of renewable energy into the power grid. Possible applications include multi-terminal DC transmission for offshore wind farms, direct interface of low-voltage solar inverters with medium-voltage distribution lines, and modular low-voltage microinverters, as discussed above.

Methods to control renewable sources to realize such CPS behavior are now presented. Multi-terminal DC transmission for offshore wind will be used as an example to illustrate the methods.

FIG. 12a depicts a possible architecture (10) for such application, in which each wind turbine (12) acts as a DC sending terminal (14) and multiple terminals are connected in series to build a medium- or high-voltage DC bus. Each set of series-connected turbines will be referred to as a string (15), and multiple strings can operate in parallel to build up the current capacity. Alternatively, multiple turbines (12) can be connected in parallel first to form a row (17) to build up the current, and multiple rows are then connected in series to build up the voltage. The latter is equivalent to the matrix architecture (19) shown in FIG. 12b and may require more cables, but can help to reduce the voltage variation of each terminal.

The control methods will be developed for the parallel-string architecture first, and then extended to the series-row (matrix) architecture. In all cases, the DC bus voltage, $v_{dc}$, is assumed to be established and controlled by the onshore inverter station.

The electrical system of each turbine acting as a sending terminal in the multi-terminal network is assumed to consist of a synchronous generator (60) and a power electronics converter (16) (also referred to herein sometimes as a power conditioning circuit), as depicted in FIG. 13a. The converter generates a DC output from the variable-frequency ac output of the generator. Different power electronics circuits can be used to perform this function. The development here will not assume a specific converter circuit, but rather will be based on two generic, electrically dual configurations of the DC output section of the circuit:

1) Capacitive Output Converter (65): The first element seen from the DC output into the converter is a capacitor (C) connected between the two output terminals (64), as depicted in FIG. 13b. The remainder of the converter will be treated as a parallel current source (66), which can be continuous (such as in the case when a buck or buck-derived converter is used) or pulse-width modulated (such as in the case when a buck-boost or boost type converter is used.) In either case, the current i defined in FIG. 13b represents the average of the current that is delivered to charge the output capacitor over a switching cycle of the converter.

2) Inductive Output Converter (67): The first element seen from the DC output into the converter is an inductor (L) connected to the positive or negative terminal of the DC output (64). FIG. 13c shows the case when the inductor is at the positive terminal, and the circuit is functionally equivalent if the inductor is placed on the negative terminal. The remainder of the converter will be treated as a voltage source (68) in series with the inductor (L). There are two different ways to realize such inductive output: (a) using a buck or buck-derived converter without output capacitor, or (b) adding a series inductor to a capacitive-output converter. The voltage source is pulse-width modulated in case (a) and continuous in case (b). In either case, v represents the average of the voltage that drives the current i to the output.

The control methods described below will seek to make v·i constant for each type of converter. This is essentially the power output of the controlled source in each case, and is different from the actual output power of the converter, which can be expressed by $$v\left[i - C\frac{dv}{dt}\right] = vi - \frac{d}{dt}\left[\frac{1}{2}Cv^2\right] \quad (2)$$

for a capacitive-output converter, and by $$i\left[v - L\frac{di}{dt}\right] = vi - \frac{d}{dt}\left[\frac{1}{2}Li^2\right] \quad (3)$$

for an inductive-output converter. The second term in equations (2) and (3) represents the rate of change of the energy stored in the output capacitor and inductor, respectively. Since this term is relatively small and only exists during transient, each converter can still be considered a constant-power source at its output terminals when the internal source is controlled as a CPS.

FIG. 14 depicts the overall control scheme of a turbine, which consists of generator-side control (70) and (DC) network-side control (72). The main function of the generator-side control is to regulate the turbine speed such that the maximal amount of power is extracted. Other functions of the generator-side control (70) may include regulating the wave-shape and power factor of the generator output current to maximize the generator efficiency and maintain a more stable voltage. Different existing control methods can be applied to fulfill these requirements.

The focus of this invention is the network-side control (72) that is responsible for providing the desired constant-power source behavior. Among other signals, a power signal (p) will be exchanged between the two parts of the control. The generator-side control (70) provides this signal, based on either measurement or estimation, to indicate the amount of power that is available for feeding into the network, and the network-side control (72) will use this signal as a command to control its output power. Conversely, the network-side control (72) will communicate the level of desired power level to the generator-side control (70) during start-up, shut-down, or power curtailment when the turbine output power has to be reduced or limited.

Control of Capacitive-Output Converters

As stated before, the objective of network-side control (72) for a capacitive-output converter (62) is to regulate the current i (see FIG. 13*b*) such that vi=P, where P is the desired output power determined by the generator-side control based on the amount of power available from the turbine, or by the network-side control (72) based on network operation conditions and voltage and/or current limits of the converter. This can be achieved by a current controller that uses P/v as reference and regulates the equivalent controlled current source shown in FIG. 13*b* to follow this reference.

Many existing current control methods can be used to implement this current control function. Additional control functions may be included to limit the current reference level and its slew rate for safety of operation. The actual current may not exactly follow the reference instantly depending on the form of the reference as well as the dynamics of the converter and control. Detailed circuit and control models can be used to analyze such nonlinear and dynamic behavior. For the sake of explaining the principle of the control methods, it is assumed in the following that the current reference is equal to P/v unless otherwise specified and that the actual controlled current i follows this reference perfectly. Additionally, it is assumed that the DC bus behaves like an ideal voltage source.

String Startup

Since parallel strings operate independently except for some minor coupling due to cable impedance, we will examine the operation of a single string first. A string (15) of n turbines (12) can be connected to the multi-terminal DC network in the following steps:

1) Establish and stabilize the DC bus voltage by using the onshore power (inverter) station.
2) Connect the turbine DC outputs in series without power output and without connection to the DC bus, as indicated in FIG. 15*a*.
3) Close the string circuit breaker (13) to connect the string (15) to the DC bus (11) while keeping the output power of each turbine at zero. The DC bus voltage, $v_{dc}$, is applied to the string and is divided among the output capacitors (C1, C2 . . . Cn) of the converters (16), as illustrated in FIG. 15*b*. Ideally, all converters (16) should be identical such that each converter output capacitor is charged to $v_{dc}/n$. Practical mismatch of the capacitance value and leakage current may lead to slightly unbalanced voltages, but such unbalance is usually small and can be ignored in principle analysis.
4) The network-side control (72) of each turbine converter (16) detects a stable output capacitor voltage and starts to ramp up its current output. The ramp-up should be controlled at a sufficiently slow rate to ensure safety of operation. Under ideal conditions, all turbine power outputs are equal such that their output currents ramp up towards the same value at the same rate. In this case, all capacitor voltages will remain constant at the pre-charged level ($v_{dc}/n$) during current ramp-up. Unequal power outputs from different turbines will cause variation of the capacitor voltages, which can be understood based on the analysis in the following.

In any case, the end results (steady state) of the start-up will be that a) all turbine output currents are equal to the total string current is (such that the net charging current of each capacitor is zero), and b) each turbine output capacitor voltage settles at $P_k/i_s$, where $P_k$ is the output power of the turbine. FIGS. 15*c* and 15*d* show two cases for a three-turbine string. The DC bus voltage is assumed to be 30 kV. For the case of FIG. 15*c*, each turbine puts out 2 MW of power such that the bus voltage is equally divided among the three terminals. For the case of FIG. 15*d*, the turbine outputs from top down are 1 MW, 1.5 MW, and 0.5 MW, respectively, resulting in unequal voltages. In either case (and in general when there are n turbines in a string), the steady-state string current can be determined from $$i_s = \frac{1}{v_{dc}} \sum_{k=1}^{n} P_k \quad (4)$$

and the DC output voltage of each turbine converter can be determined as follows:

$$v_k = \frac{P_k}{i_s} = \frac{P_k}{\sum_{k=1}^{n} P_k} \cdot v_{dc}, k = 1, 2, \ldots n \quad (5)$$

Note that these steady-state voltages are determined by the power output of the turbines, and are independent of the converter output capacitance. In other words, mismatch in converter output capacitance may affect the initial voltage of the turbines but has no effects on the steady-state voltages once the turbines are operating.

Voltage Rebalance and Transient

To see the ability of the proposed control to automatically adjust individual cell output voltages or to readjust the voltages when turbine output powers are unbalanced or change, consider the transition from FIGS. 15*c* to 15*d*. For this purpose, assume the string is initially working under the condition indicated by FIG. 15*c*. At t=0, the output powers of the sending terminals change from $P_1=P_2=P_3=2$ MW to $P_1=1$ MW, $P_2=1.5$ MW, and $P_3=0.5$ MW. The output capacitance of each sending terminal is assumed to be 100 μF. Under the assumptions made before, the response of each sending terminal output voltage can be solved from the following equations:

$$C_1 \frac{dv_1}{dt} - C_3 \frac{dv_3}{dt} = i_1 - i_3 \quad (6)$$

$$C_3 \frac{dv_3}{dt} - C_2 \frac{dv_2}{dt} = i_3 - i_2 \quad (7)$$

$$C_2 \frac{dv_2}{dt} - C_1 \frac{dv_1}{dt} = i_2 - i_1 \quad (8)$$

$$i_k = \frac{P_k}{v_k}, k = 1, 2, 3; \sum_{k=1}^{3} v_k = v_{dc} \quad (9)$$

Note that the three differential equations are dependent such that only two are needed. FIG. 16 shows the simulated responses of the cell voltages and currents during the transient.

As can be seen, all voltages and currents settle smoothly towards their desired values. Note that there is a step change in each of the currents in FIG. 16 at t=0. This is the consequence of the step change in the power and the ideal current control characteristics assumed in the analysis.

As noted before, the sending terminal output capacitance doesn't affect the voltage distribution once the sending terminal is active. This can be seen from the simulation shown in FIG. 17, where the conditions are the same as that used for the simulation in FIG. 16 except that the sending terminal capacitance is changed from $C_1=C_2=C_3=100$ μF to $C_1=150$ μF, $C_2=2.5$ μF, and $C_3=2$ μF. As can be seen, all voltages and currents settle to the same steady-state values as in FIG. 16 and FIG. 15d, but the transient takes longer because of the increased capacitance.

In general, transient responses of a string of n turbines can be simulated using the following equations:

$$C_{k+1}\frac{dv_{k+1}}{dt} - C_k\frac{dv_k}{dt} = i_{k+1} - i_k, k = 1, 2, \ldots, n-1 \quad (10)$$

$$i_k = \frac{P_k}{v_k}, k = 1, 2, \ldots, n-1 \quad (11)$$

$$\sum_{k=1}^{n} v_k = v_{dc} \quad (12)$$

Dynamics of the converter and control can be incorporated by replacing each current in equation (10) by the actual current of each converter sending terminal while treating equation (11) as the reference for the current controller. Dynamics of the DC bus and the cable, including cable resistance, can also be incorporated by modifying equation (12).

Protection, Operation under Fault, and Shutdown

Equation (5) can be rearranged as follows where $P_{av}$ is the average turbine output power:

$$v_k = \frac{P_k}{\sum_{k=1}^{n} P_k} \cdot v_{dc} = \frac{P_k}{P_{av}} \cdot \frac{v_{dc}}{n}, k = 1, 2, \ldots n \quad (13)$$

Based on this, the steady-state output voltage of a sending terminal will exceed 1/n of the DC bus voltage if the sending terminal output power is higher than the average output power of all turbines in the string. Therefore, excessive voltage may build up across a sending terminal if the sending terminal power is significantly higher than other sending terminals. To limit the sending terminal voltage, thereby avoiding possible damage, the sending terminal output power can be reduced, or curtailed, when its output voltage reaches a certain level.

Such curtailment control can be implemented using the methods discussed above. When power curtailment is invoked, the network-side control (72) will also send a signal to the generator-side control (70) to reduce the generator output power such that no high voltage would be built up inside the converter due to input-output power imbalance.

The string current, determined by the total power of the string based on equation (4), is less a concern for protection in the parallel-string architecture. Nevertheless, power curtailment (of all turbines) can be used to reduce the string current when needed.

A disconnect switch (74) and a bypass diode (76) can be added at the output of each sending terminal to provide fault isolation capabilities, as depicted in FIG. 18. In the event of failure of the converter sending terminal, the switch can be open and the bypass diode will be forced to conduct by the string current. The same switch (74) can be used to connect and disconnect the sending terminal from the string under normal conditions.

With the bypass diode (76), operation of the string when one sending terminal is removed is equivalent to having that sending terminal output power set at zero, which implies that all other sending terminal voltages have to increase in order to compensate for the lost sending terminal. Therefore, there is a limit for the number of failed sending terminals before the voltage on remaining sending terminals becomes too high and the string has to be shut down.

There are two ways to shut down a string:
1) Controlled Shutdown: In this case, the output power of all sending terminals is gradually reduced (ramped down) to zero. Once the string current reaches zero, the string breaker (13) can be opened to remove the string from the DC bus. This can be invoked, for example, when a certain number of sending terminals have failed and the remaining sending terminals cannot safely operate with the imposed bus voltage.
2) Emergency Shutdown: In the event that the string breaker (13) opens abruptly due to fault within the string or on the DC bus while individual sending terminals are still "alive", that is, still putting out current, the live sending terminal voltages will rise, trigging a reduction in the sending terminal output currents, which will eventually reach zero as the sending terminal voltages continue to rise. Once the current is zero, the switch (74) shown in FIG. 18 can be opened to remove the sending terminals from the string.

Operation in Series-Row and Matrix Configuration

Capacitive-output sending terminals can also operate in parallel. In fact, it is easy to see that m parallel sending terminals is equivalent to a single CPS having an output power equal to $$P = \sum_{k=1}^{m} P_k$$

where $P_k$ is the output power of the $k^{th}$ sending terminal in the row. Therefore, the operation and analysis methods outlined above can also be applied to series-row and matrix networks by treating each row as a single capacitive-output cell having the total combined power and capacitance of all sending terminals in the row.

Control of Inductive-Output Converters

Inductive-output sending terminals can be connected in parallel and then in series with a current-source bus (80), as depicted in FIG. 19a. This topology and its equivalent circuit (FIG. 19b) are dual to the string of sending terminals in parallel with a voltage-source bus (FIGS. 15a and b). Hence a dual control method can be applied to each sending terminal to operate the system. Specifically, the voltage source ($v_k$) behind the inductor (L) is controlled such that $v_k i_k$ is equal to $P_k$, the desired power output of the $k^{th}$ cell. Under the assumption that this voltage control is ideal, equations governing the operation of n parallel inductive-output sending terminals in series with a current source $i_{dc}$ (80) can be developed as follows by applying the principle of duality to equations (9)-(11):

$$L_{k+1}\frac{di_{k+1}}{dt} - L_k\frac{di_k}{dt} = v_{k+1} - v_k, k = 1, 2, \ldots, n-1 \quad (14)$$

$$v_k = \frac{P_k}{i_k}, k = 1, 2, \ldots, n-1 \tag{15}$$

$$\sum_{k=1}^{n} i_k = i_{dc} \tag{16}$$

The operation principle and procedure discussed before for series-connected capacitive-output sending terminals can be applied to this configuration as well. For example, to start the system, the n sending terminals will be connected in parallel first without any power output. The circuit breaker (82) in parallel with the bus current source (80) is then open. The output voltage of each sending terminal is then ramped up to gradually increase the power. Current rebalance and transient in response to changes in sending terminal output power can also be simulated by solving equations (14)-(16).

As an example, FIG. 20 shows the transient responses of a three-terminal row connected to a 3 kA bus. The output inductance of the sending terminals is $L_1=L_2=L_3=5$ mH. Initially, the output powers of the sending terminals are $P_1=P_2=P_3=2$ MW. The corresponding bus voltage is 2 kV. At t=0, the sending terminal output powers are changed to $P_1=1$ MW, $P_2=1.5$ MW, and $P_3=0.5$ MW. FIG. 20 shows that the bus voltage will settle at a new level of 1 kV, and the sending terminal currents will adjust automatically to match the new power output of each sending terminal. The transient behavior is similar to that shown in FIG. 16.

Note that series connection of inductive-output sending terminals in series with a current source is dual to parallel connection of capacitive-output sending terminals in parallel with a voltage source. The operation of individual sending terminals in each such configuration is independent of other sending terminals (except for minor coupling due to network impedance). Hence each sending terminal can be controlled using conventional voltage and current control methods. The output capacitor of the capacitive-output sending terminal and inductor of the inductive-output cell can also be removed in these configurations without affecting the functionality. However, they are usually retained to provide filtering of switching ripple. Additional filtering components (inductors and capacitors) can be included at the sending terminal output to further attenuate the high-frequency ripple in each of the configurations discussed thus far. These components usually don't affect the steady-state operation, and their effects on dynamic behavior can be ignored if their corner frequencies are outside the control bandwidth.

In summary, methods to form multi-terminal (series, parallel, and meshed) power systems by controlling each terminal to behave as a constant-power source are provided by the current invention. A constant-power source in this context refers to the ability of the source to simultaneously adjust its output voltage and current in response to changing external circuit conditions, while maintaining constant the product of the output voltage and output current. The present invention facilitates:

Use of CPS instead of conventional voltage or current sources to form multi-terminal power networks.
Different system configurations enabled by CPS behavior: series, parallel, parallel-string, series-row, and matrix.
Modification of CPS i-v characteristics to reduce voltage and current variations of individual CPS sending terminals when system operation conditions change.
Applications in multi-terminal DC transmission, series connection of low-voltage solar inverters for direct interface with medium-voltage distribution lines, and modular low-voltage microinverters.

Among different applications, the current methods would benefit the integration of renewable energy into the power grid by enabling new system architectures that are modular, inherently more efficient, less costly, and more reliable.

Furthermore, methods to control renewable sources for integration into a multi-terminal DC network are provided for two different types of converter circuits.

A capacitive-output converter has a capacitor at its output and a parallel current source behind it that represents the rest of the converter. The voltage across the capacitor is left to be determined by system operation while the current source is locally controlled by the sending terminal.
Control of the current source in a capacitive-output converter is implemented locally by using i=p/v as a reference, where p is the desired output power of the converter and v is the voltage across the output capacitor.
An inductive-output converter has an inductor at its output and a series voltage source behind it that represents the rest of the converter. The current through the inductor is left to be determined by system operation while the voltage source is locally controlled by the sending terminal.
Control of the voltage source in an inductive-output converter is implemented locally by using v=p/i as a reference, where p is the desired output power of the converter and i is the current through the output inductor.
Capacitive-output converter sending terminals can be connected in series, parallel, or in a meshed (matrix) form with both series and parallel connection to form a multi-terminal converter network.
When operated in parallel with an external voltage source, the multi-terminal network of capacitive-output cells can automatically adjust individual sending terminal output voltage and output current to satisfy network operation constraints while achieving desired output power for each sending terminal.
Inductive-output converter sending terminals can also be connected in series, parallel, or in a meshed (matrix) form with both series and parallel connection to form a multi-terminal converter network.
When operated in series with an external current source, the multi-terminal network of inductive-output sending terminals can automatically adjust individual sending terminal output voltage and output current to satisfy network operation constraints while achieving desired output power for each sending terminal.
The disclosed control methods are implemented locally for each sending terminal and require no communication with other sending terminals in the network, yet can achieved desired overall network behavior in terms of steady-state operation as well as transient stability.
Startup, protection, operation under fault condition, and system shutdown methods are also provided for each system configuration.

What is claimed is:

1. A method for forming and operating a multi-terminal power system, comprising:
connecting multiple sending terminals to a receiving network of the power system; and locally controlling each sending terminal, such that each sending terminal requires no communication with other sending terminals, to behave as a constant-power source such that both output voltage and output current of the sending terminal may simultaneously vary in response to changing external circuit conditions while maintaining constant a product of the output voltage and the output current of the sending terminal, and wherein either: (a) at least some of the multiple sending terminals are connected in series to form a plurality of strings, and the strings are connected in parallel to feed power to the receiving terminal; or (b) at least some of the multiple sending terminals are connected in parallel to form a plurality of rows, and the rows are connected in series to feed power to the receiving terminal.

2. The method of claim 1, wherein the changing external circuit conditions include at least one of: varying voltage and current of the network, or varying power levels of the sending terminals; and the multiple sending terminals are connected in a series, parallel or a matrix configuration.

3. The method of claim 1, wherein at least some of the multiple sending terminals are connected in series to form a plurality of strings, and the strings are connected in parallel to feed power to the receiving terminal, the receiving terminal behaving as a voltage source.

4. The method of claim 3, wherein each said string comprises a series connection of: solar inverters or micro-inverters directly interfacing with a distribution network or grid or offshore wind turbines for DC transmission to an onshore power grid.

5. The method of claim 1, wherein at least some of the multiple sending terminals are connected in parallel to form a plurality of rows, and the rows are connected in series to feed power to the receiving terminal, the receiving terminal behaving as a current source.

6. The method of claim 1, wherein each sending terminal comprises a renewable energy source and an associated power conditioning circuit, and said local control produces constant power source behavior at output terminals of the power conditioning circuit.

7. The method of claim 6, wherein the renewable energy source comprises a wind turbine equipped with a generator and said power conditioning circuit comprises a rectification circuit.

8. The method of claim 1, further comprising: modifying constant-power source behavior of the sending terminal by reducing power output of the sending terminal when at least one of the output voltage or the output current exceeds a pre-specified level.

9. The method of claim 1, wherein the sending terminal comprises an AC source and the power of the constant-power source means average power over a fundamental cycle.

10. The method of claim 1, wherein at least one sending terminal includes a power conditioning circuit comprising a capacitive output converter having a capacitor connected between two output terminals and the rest of the power conditioning circuit acts as a controlled current source connected in parallel to the capacitor, and wherein the local control comprises: controlling the current source to follow P/v as a reference, where P is the desired output power of the converter and v is the voltage across the output capacitor.

11. The method of claim 1, wherein at least one sending terminal includes a power conditioning circuit comprising an inductive output converter having an inductor connected to an output terminal and the rest of the power conditioning circuit acts as a controlled voltage source connected in series with the inductor, and wherein said local control comprises: controlling the voltage source to follow P/i, where P is the desired output power of the converter and i is a current through the inductor.

12. The method of claim 6, further comprising: connecting a bypass diode in parallel to the output terminals of the power conditioning circuit, and connecting a disconnect switch in series between the output terminals and the bypass diode to further provide fault isolation.

13. The method of claim 7, wherein said rectification circuit includes a rectifier and a DC-DC converter, the DC-DC converter being a capacitive output converter or an inductive output converter.

14. The method of claim 13, wherein the local control involves a generator-side control and a network-side control, the generator-side control regulating the rectifier and the generator such that maximal amount of power is extracted from the wind turbine, and the network-side control regulating the DC-DC converter to produce the constant-power source behavior.

15. The method of claim 14, wherein the generator-side control provides a power signal to the network-side control indicating amount of power that is available for feeding into the network, and the network-side control uses said signal as a command to control output power, and the network-side control communicates a level of desired power level to the generator-side control during start-up, shut-down, or power curtailment when the output power has to be reduced or limited.

16. A method for forming and operating a multi-terminal power system, comprising:
  connecting multiple sending terminals to a receiving network of the power system; and locally controlling each sending terminal to behave as a constant-power source such that both output voltage and output current of the sending terminal may simultaneously vary in response to changing external circuit conditions while maintaining constant a product of the output voltage and the output current of the sending terminal, and wherein either: (a) at least some of the multiple sending terminals are connected in series to form a string, and the string is connected in parallel with the receiving terminal; or (b) at least some of the multiple sending terminals are connected in parallel to form a row, and the row is connected in series with the receiving terminal;
  wherein at least one sending terminal includes a power conditioning circuit comprising a capacitive output converter having a capacitor connected between two output terminals and the rest of the power conditioning circuit acts as a controlled current source connected in parallel to the capacitor, and wherein the local control comprises: controlling the current source to follow P/v as a reference, where P is the desired output power of the converter and v is the voltage across the output capacitor.

17. A method for forming and operating a multi-terminal power system, comprising:
  connecting multiple sending terminals to a receiving network of the power system; and locally controlling each sending terminal to behave as a constant-power source such that both output voltage and output current of the sending terminal may simultaneously vary in response to changing external circuit conditions while maintaining constant a product of the output voltage and the output current of the sending terminal, and wherein either: (a) at least some of the multiple sending terminals are connected in series to form a string, and the string is connected in parallel with the receiving terminal; or (b) at least some of the multiple sending terminals are connected in parallel to form a row, and the row is connected in series with the receiving terminal;

wherein at least one sending terminal includes a power conditioning circuit comprising an inductive output converter having an inductor connected to an output terminal and the rest of the power conditioning circuit acts as a controlled voltage source connected in series with the inductor, and wherein said local control comprises: controlling the voltage source to follow P/i, where P is the desired output power of the converter and i is a current through the inductor.

* * * * *